(12) United States Patent
Nefcy et al.

(10) Patent No.: US 9,393,964 B2
(45) Date of Patent: Jul. 19, 2016

(54) METHOD OF CONTROLLING VEHICLE TORQUE

(71) Applicant: FORD GLOBAL TECHNOLOGIES, LLC, Dearborn, MI (US)

(72) Inventors: Bernard D. Nefcy, Novi, MI (US); Matthew John Shelton, Grosse Ile, MI (US); Daniel Scott Colvin, Farmington Hills, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 14/305,289

(22) Filed: Jun. 16, 2014

(65) Prior Publication Data

US 2015/0360690 A1   Dec. 17, 2015

(51) Int. Cl.
| | |
|---|---|
| *B60W 30/19* | (2012.01) |
| *B60W 30/184* | (2012.01) |
| *F02D 41/02* | (2006.01) |
| *B60W 10/06* | (2006.01) |
| *B60W 10/08* | (2006.01) |
| *B60W 10/11* | (2012.01) |
| *F02D 41/00* | (2006.01) |

(52) U.S. Cl.
CPC ............ *B60W 30/184* (2013.01); *B60W 10/06* (2013.01); *B60W 10/08* (2013.01); *B60W 10/11* (2013.01); *B60W 20/15* (2016.01); *B60W 30/19* (2013.01); *F02D 41/0002* (2013.01); *F02D 41/023* (2013.01); *F02D 2200/602* (2013.01); *F02D 2250/28* (2013.01); *Y10S 903/93* (2013.01); *Y10T 477/23* (2015.01); *Y10T 477/67* (2015.01); *Y10T 477/677* (2015.01)

(58) Field of Classification Search
None
See application file for complete search history.

(56) References Cited

U.S. PATENT DOCUMENTS

| | | | | |
|---|---|---|---|---|
| 7,214,163 | B2 * | 5/2007 | Jeon ..................... | B60W 30/18 477/109 |
| 7,261,671 | B2 | 8/2007 | Ortmann et al. | |
| 7,775,934 | B2 * | 8/2010 | Dickinson ............... | F02D 37/02 477/102 |
| 8,061,462 | B2 | 11/2011 | Soliman et al. | |
| 2001/0006059 | A1 * | 7/2001 | Lee ....................... | B60W 10/06 123/436 |
| 2009/0204280 | A1 | 8/2009 | Simon, Jr. et al. | |
| 2015/0120115 | A1 * | 4/2015 | Chinbe ................. | B60W 10/06 701/22 |

* cited by examiner

*Primary Examiner* — Sherry Estremsky
(74) *Attorney, Agent, or Firm* — David B. Kelley; Brooks Kushman P.C.

(57) ABSTRACT

In response to a transmission upshift command and a transmission element speed being greater than a threshold, a controller may reduce a rate of engine air intake prior to initial engagement of an oncoming shift element, at least until a target speed ratio is achieved. This reduction may reduce a transmission input torque such that upshift driveline disturbances are reduced.

18 Claims, 3 Drawing Sheets

METHOD OF CONTROLLING VEHICLE TORQUE

TECHNICAL FIELD

This disclosure relates to a method of controlling a vehicle transmission input torque.

BACKGROUND

In a non-hybrid vehicle, an inertia torque is transmitted to the driveline during transmission shifts. This results in a boost in the transmission output torque which may impact vehicle performance and cause driveline disturbances. In a hybrid electric vehicle, the inertia torque transmitted to the driveline may be larger than that of a non-hybrid vehicle due to the addition of the electric motor and disconnect clutch. Torque modulation, a form of transmission input torque reduction, may be employed to compensate for inertia torque and may be achieved by using engine spark retard or the electric machine. Spark retarding may cause a possible engine misfire. The electric machine may not have enough torque at higher speeds to effectively provide torque modulation.

SUMMARY

In at least one embodiment, a method of controlling transmission input torque is provided. The method may include, in response to a transmission upshift command, a transmission element speed greater than a speed threshold, and a transmission input torque greater than a torque threshold, reducing a rate of engine air intake prior to or during initial engagement of an oncoming shift element. The rate of engine air intake may be reduced at least until a target speed ratio is achieved to reduce a transmission input torque, such that driveline disturbances associated with the upshift are reduced.

In at least one embodiment, a controller for a hybrid electric vehicle is provided. The controller may include input communication channels configured to receive an upshift command, an accelerator pedal position signal, a transmission element speed, and an oncoming clutch pressure signal. The controller may further include output communication channels configured to provide a transmission input torque modulation command. The controller may further include control logic configured to, in response to the upshift command, the accelerator pedal position being greater than a threshold position, the transmission element speed being greater than a threshold speed, and the transmission input torque being greater than a threshold torque, command a reduction in a rate of engine air intake proximate engagement of an oncoming clutch to reduce a transmission input torque by a first amount.

In at least one embodiment, a vehicle is provided. The vehicle may include an electric machine coupled to a transmission, an engine selectively coupled with the electric machine; and at least one controller. The controller may be programmed to, in response to a transmission upshift request, the transmission input torque being greater than a threshold, and a transmission element speed being greater than a threshold, command a reduction in a rate of engine air intake to reduce a transmission input torque a first amount during a first time period, based on a transmission element torque; and a transmission element speed, prior to a change in a transmission ratio.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
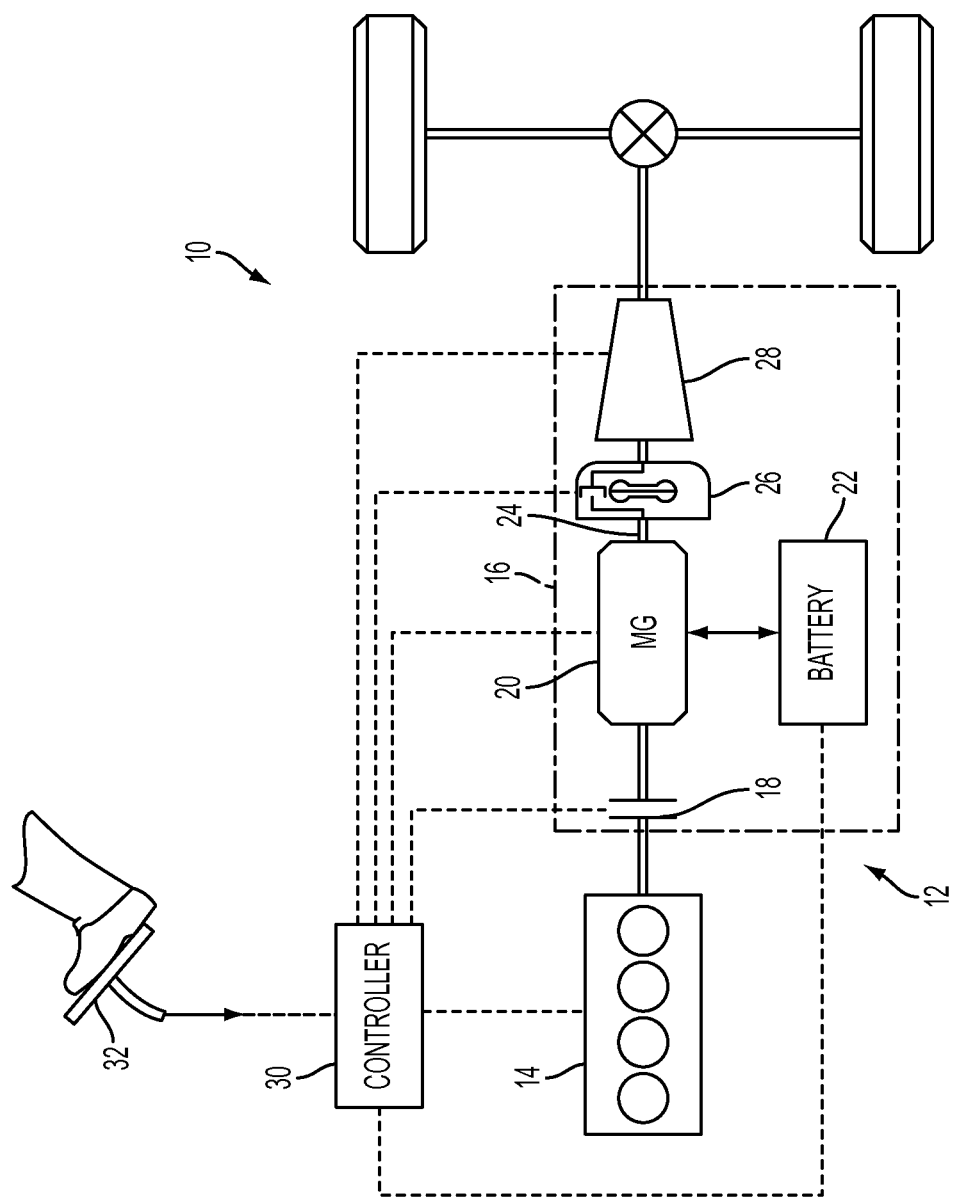
FIG. 1 is a schematic diagram of a hybrid electric vehicle.

Referring to FIG. 1, a schematic diagram of a Hybrid Electric Vehicle (HEV) 10 is illustrated according to an embodiment of the present disclosure. Physical placement and orientation of the components within the vehicle may vary. Although the powertrain of FIG. 1 will be particularly described, the strategies in accordance with embodiments of the present disclosure may apply to other powertrain configurations. The HEV 10 includes a powertrain 12 having an engine 14 that is operatively connected to a transmission 16. The transmission 16 may include a disconnect clutch 18, an electric machine such as an electric motor-generator 20, an associated traction battery 22, an input shaft 24, a launch clutch or torque converter 26, and a gear box 28.

The engine 14 may be selectively coupled to the motor-generator 20 via the disconnect clutch 18. The engine 14 and the motor-generator 20 may both act as drive sources for the HEV 10 by providing torque to the gearbox 28. The motor-generator 20 may be implemented by any one of a plurality of types of electric machines. For example, the motor-generator 20 may be a permanent magnet synchronous motor.

The transmission 16 may be configured as a step-ratio transmission using multiple friction elements for transmission gear ratio shifting. The transmission 16 may be configured to produce multiple forward and reverse via multiple gearing elements within the gear box 28.

A gear ratio change from a lower gear or speed ratio to a higher gear or speed ratio may occur in a synchronous clutch-to-clutch upshift as one friction element is engaged and a second friction element is disengaged. This upshift may reduce transmission torque multiplication and reduce engine 14 operating speed. One friction element or shift element may be referred to as an off-going clutch. The off-going clutch may be released while a second friction element or shift element, which may be referred to as an oncoming clutch, engages to create a transmission upshift. The upshift event may be divided into a preparatory phase, a torque phase, and an inertia phase. During the preparatory phase, the oncoming clutch actuator is stroked to prepare for its engagement, while the off-going clutch torque-holding capacity is reduced to prepare for its release. During the torque phase, the oncoming clutch torque is raised in a controlled manner while the off-going clutch is currently engaged or allowed to slip at a controlled slip rate.

Simultaneous engagement of the oncoming clutch and release of the off-going clutch during a transmission upshift may occur prior to or at the beginning of the inertia phase. The simultaneous engagement and release may result in a momentary activation of two torque flow paths through the gearing of the gear box 28. During the torque phase, the lower gear speed ratio from the transmission input to the transmission output is maintained. However, as the oncoming clutch gains torque capacity and the off-going clutch loses torque capacity, more of the input torque may be routed through the higher gear path until the off-going clutch no longer has torque capacity. The torque may then be routed through the higher gear path, which has a lower torque ratio.

Thus, in the small timespan of the torque transfer, the input torque goes from being multiplied by a higher amount to a lower amount before the inertia of the subsequent speed change raises the output torque again. This momentary dropping and subsequent rise of output torque is known as the "torque hole" or "inertia torque". This may be perceived by a vehicle occupant as an unpleasant shift shock or driveline disturbance associated with the transmission upshift.

A controller 30 may be in communication with the engine 14, the powertrain 12, and accelerator pedal 32. The controller may be configured to operate the HEV 10 or powertrain 12 in a charge depletion mode in which the engine 14 may be isolated from the remainder of the powertrain 12, via the disconnect clutch 18, such that the motor-generator 20 may act as the sole drive source for the HEV 10 using the traction battery as its power source. The controller 30 may also be configured to operate the HEV 10 or powertrain 12 in a charge sustaining mode in which the engine 14 is operatively connected to the remainder of the powertrain 12, such that both the engine 14 and motor-generator 20 may act as drive sources for the HEV 10.

The controller 30 may also be provided with a control algorithm to compensate for the inertia torque experienced during transmission shift events. The controller 30 may be configured to temporarily reduce or modulate a transmission input torque. The modulation of the transmission input torque may be achieved using fast-path modulation or slow-path modulation.

Fast-path modulation may provide a near instantaneous (0~30 ms response time) reduction in the transmission input torque. Fast-path modulation may attempt to achieve this reduction by retarding the engine spark, affecting ignition timing, or adjusting motor-generator torque to reduce a transmission input torque delivered to a transmission impeller.

Unfortunately, retarding of the engine spark or ignition timing may result in incomplete combustion within an engine combustion chamber. The incomplete combustion may lead to an engine misfire. The driver of the HEV 10 may experience a sharp jerking or shuddering action when such a combustion event occurs.

Another method of fast-path modulation may be employed in addition to or alternatively to the above mentioned methods using the electric machine (motor-generator) 20. As the engine 14 drives the motor-generator 20, in at least a charge sustaining mode, the motor generator 20 may provide a negative torque. The negative torque provided by the motor generator 20 may reduce the net torque transmitted by the input shaft 24 to a transmission element during the upshift event. The transmission element may be the torque converter 26 or a transmission impeller (not shown).

Any excess torque produced by the engine 14 during the upshift event may be recovered and converted into electrical energy that may be stored by the traction battery 22, while achieving the requested input torque modulation and providing improved shift quality. The motor-generator 20 may lack sufficient torque to modulate the transmission input torque at higher speeds and slow-path modulation may be employed to provide additional transmission input torque modulation.

Slow-path modulation may provide as the name implies a slower (80-130 ms response time) reduction in transmission input torque. Slow-path modulation may attempt to achieve reduction in the transmission input torque by affecting the air provided to the engine 14. The controller 30 may affect the rate of intake air provided to the engine or engine combustion chamber by adjusting the throttle valve/plate, management of the turbocharger, and adjusting the variable valve timing. The implementation/timing and total amount of torque reduction of the slow-path modulation may be flexible and directly tied to the transmission torque strategy.

Certain enablement basics may be met prior to implementing transmission input torque modulation. The enablement basics may include a vehicle speed greater than a threshold vehicle speed, a transmission input torque greater than a threshold input torque, an engine speed greater than a threshold engine speed (e.g. 3000 rpm), and an accelerator pedal position greater than a threshold pedal position (e.g. 60%). A transmission upshift command or request may be issued in response to either the vehicle speed or engine speed greater than their respective thresholds and an accelerator pedal position greater than a threshold. These enablement basics may indicate a power-on transmission upshift. Upon detecting the enablement basics, the controller 30 may look to the clutch pressures of the off-going and oncoming clutches to anticipate or predict when to apply torque modulation.

The controller 30 may be configured to coordinate the implementation of the slow-path modulation and the fast-path modulation. An entire transmission upshift may take on average 800-1000 ms, and the torque modulation, coordinated between fast-path and slow-path, may take on average 300-500 ms. Therefore, timing of the torque modulation may affect the overall transmission shift timing.

While illustrated as one controller, the controller 30 may be part of a larger control system and may be controlled by various other controllers throughout the HEV 10, such as a vehicle system controller (VSC). It should therefore be understood that the controller 30 and one or more other controllers can collectively be referred to as a "controller" that controls various actuators in response to signals from various sensors to control functions such as starting/stopping engine 14, operating motor-generator 20 to provide wheel torque or charge the traction battery 22, selecting or scheduling transmission shifts, etc.

The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 30 may communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 30 may communicate signals to and/or from the engine 14, powertrain 12, and accelerator pedal 32. Although not explicitly illustrated, those of ordinary skill in the art will recognize various functions or components that may be controlled by the controller 30 within each of the sub systems identified above.

Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, electric machine operation, clutch pressures, and transmission, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), and deceleration or shift mode (MDE).

In one representative example, the controller 30 may be configured to receive multiple signals via input communication channels. The signals may be indicative of an accelerator pedal position, an engine speed, a transmission element speed or torque, the input shaft speed or torque, a vehicle speed, an electric machine speed or torque, and various transmission signals. The transmission signals may include off-going clutch and oncoming clutch pressures, shift indicators or commands, shift element torque or speed, and transmission gear ratios or speed ratios.

The controller 30 may receive and interpret the accelerator pedal position signal during a transmission shifting event and divide them into three areas: light pedal, medium pedal or heavy pedal. The accelerator pedal position may correlate to a driver torque request or a torque command. Light pedal area may correspond to an accelerator pedal position less than a threshold while the powertrain 12 is operated in a hybrid electric mode where both the engine 14 and motor-generator 20 are capable of acting as drive sources for the HEV 10.

The medium pedal area may correspond to an accelerator pedal position greater than the light pedal area threshold while the powertrain is operated in a hybrid electric mode. The medium pedal area may also correspond to an accelerator pedal position equal to or slightly greater than the light pedal area threshold when traction battery 22 state of charge or motor generator 20 charge power is less than a state of charge or charge power threshold. The heavy pedal area may correspond to an accelerator pedal position greater than both the light pedal area and the medium pedal area thresholds while the powertrain 12 is operated in hybrid electric mode.

The controller 30 may also be configured to output commands to various vehicle components to modulate transmission input torque via output communication channels. Modulation of transmission input torque may be characterized as a reduction in the input torque delivered to the transmission, followed by an increase in the input torque delivered to the transmission to satisfy a driver demand corresponding to a current accelerator pedal position.

The controller 30 may be provided with control logic configured to calculate or estimate a driveline inertia torque and a predicted amount of driveline inertia torque to be removed from the driveline via fast-path and/or slow-path torque modulation. The amount of driveline torque removed may be based on various component rotational speeds and torques such as the transmission impeller or transmission input shaft.

The controller 30 may also be provided with control logic configured to determine or predict when to remove inertia torque. The controller 30 may coordinate between fast-path and slow-path torque modulation to remove inertia torque and improve shift and ride quality.

The controller 30 may receive a transmission upshift command and determine when to implement transmission input torque modulation. The controller may monitor clutch pressures of the oncoming shift element or clutch and the off-going shift element or clutch. During a transmission shift event, an increase in the fluid pressure of an oncoming shift element and a decrease in the fluid pressure of an off-going shift element may occur. The respective increase and decrease in fluid pressures of the shift elements may be indicative of an impending transmission upshift.

If the accelerator pedal position is in the medium to heavy pedal area (accelerator pedal position greater than a threshold) the controller may analyze the rate of increase or ramp rate of the oncoming clutch pressure. The off-going or oncoming shift element pressure or the ramp rate of the oncoming clutch pressure may enable the controller to determine that start of the transmission input torque modulation. The duration of the transmission input torque modulation may also be determined by the shift element pressures or ramp rates. For example, the higher the ramp rate, the earlier the transmission input torque modulation may be implemented during the transmission upshift event. The lower the ramp rate, the later the transmission input torque modulation may be implemented during the transmission upshift event.

Duration of the transmission input torque modulation may be based on the clutch pressures of the oncoming or off-going shift elements. The controller 30 may be provided with control logic indicating a current transmission speed ratio and a desired transmission speed ratio to be achieved as a result of the upshift. Based on the current transmission speed ratio compared to the desired transmission speed ratio and the rate of change of the transmission speed ratio, the controller 30 may estimate the time required until the end of the upshift when the desired transmission speed ratio is achieved. Using this time, the controller 30 may then estimate the duration of transmission input torque modulation to not negatively affect the overall transmission upshift timing.

The controller 30 may determine the amount of transmission input torque to remove based on the inertia torque of the driveline components. The inertia torque of the driveline components may be estimated based on the transmission impeller speed or transmission input shaft speed. Should the estimated inertia torque exceed a threshold, transmission input torque modulation may be implemented to reduce the transmission input torque.

FIGS. 2A through 2D depict corresponding time plots of the transmission ratio, fast-path torque modulation, slow-path torque modulation, and the transmission input torque, respectively. The plots may correspond in time and demonstrate an exemplary embodiment of a transmission input torque modulation.

Figure 2A:
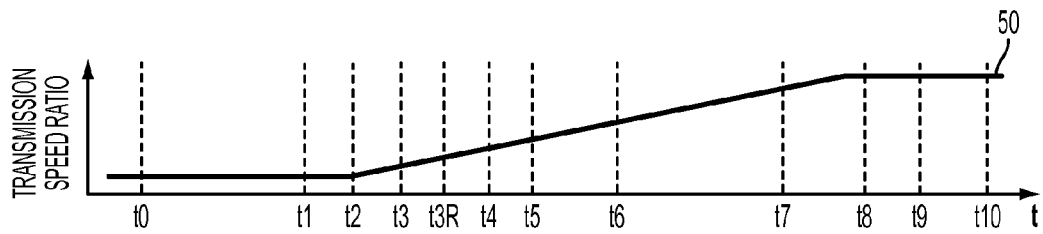
FIGS. 2A-2D are corresponding time plots showing an exemplary system response.

FIG. 2A is a plot of the transmission ratio 50 during a transmission upshift. At time $t_0$ the controller may anticipate the beginning of a transmission upshift based on the instantaneous clutch pressures or on the ramp rate of the clutch pressures. The amount of torque modulation required may simultaneously be determined based on the transmission impeller speed or estimated transmission impeller torque. Alternatively, the amount of torque modulation required may be determined based on the speed or torque of various transmission elements.

Figure 2B:
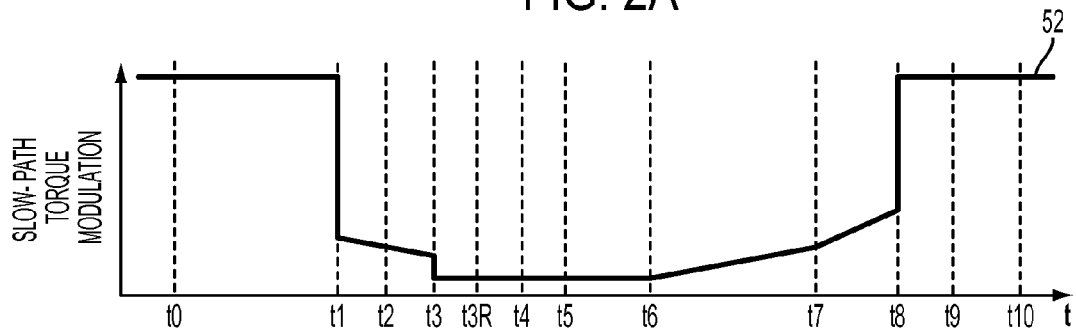

FIG. 2B is a plot of the slow-path torque modulation 52 during a transmission upshift. The controller 30 may request slow-path modulation at time $t_1$. The slow-path modulation request may be sent as the off-going clutch and on-coming clutch pressures are prepared to begin to control the transmission upshift. The slow-path torque may begin to ramp down the transmission input torque a first amount in advance of the initial engagement of the oncoming clutch at $t_2$. The slow-path torque modulation may reduce the rate of engine air intake by reducing the rate of engine air intake into the engine's combustion chamber.

Figure 2C:
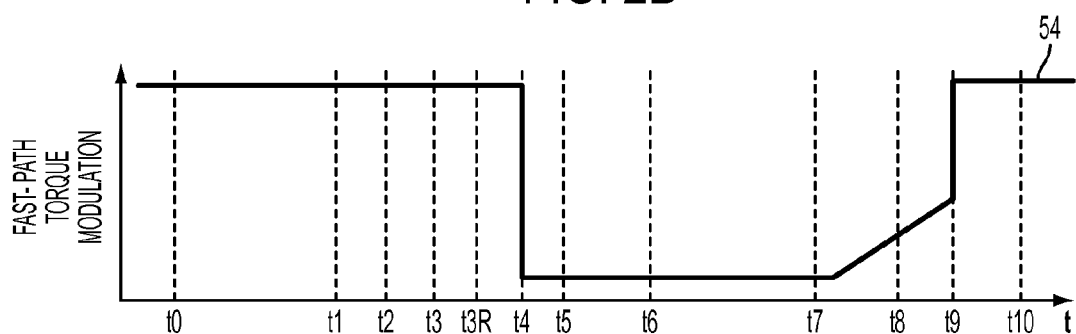

FIG. 2C is a plot of the fast-path torque modulation 54 during a transmission upshift. The controller 30 may delay or refuse application of fast-path torque modulation if the slow-path torque modulation is capable of removing sufficient driveline torque.

Figure 2D:
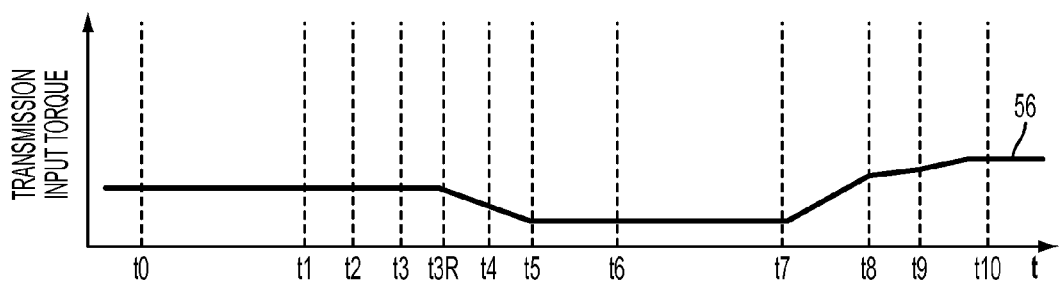

FIG. 2D is a plot of the transmission input torque 56 during a transmission upshift. The controller 30 may continue to monitor the transmission ratio change. In response to a transmission ratio change proximate time $t_3$, the slow-path torque modulation may request a further ramp down in transmission input torque a second amount. The actual reduction in the transmission input torque may not begin to reduce or modulate until time $t_{3R}$.

Fast-path torque modulation, as depicted in FIG. 2C, may be triggered at $t_4$ in response to a functional change in the transmission ratio indicating a percentage completion in the upshift less than a threshold percentage completion. The fast-path torque modulation may request a ramp down in the transmission input torque a third amount in advance of the initial engagement of the oncoming clutch at time $t_4$. The fast-path torque modulation may reduce the rate of transmission input torque by adjusting the engine ignition timing and/or the motor generator torque. The further reduction in the transmission input torque by the third amount may be nearly instantaneous and the full reduction in transmission input torque may be fully delivered at time $t_5$.

The first, second and third amounts of reduction in transmission input torque may be different values. It is also contemplated that based on the amount of transmission input torque modulation required, the controller 30 may request the fast path or the slow-path torque modulation.

In response to the upshift percentage completion greater than a threshold, the controller 30 may begin to coordinate between the slow-path and fast-path torque modulation such that the input transmission torque may satisfy the driver demanded torque. The upshift percentage completion may be based on how close the current transmission speed ratio is to the final transmission speed ratio to be achieved at the completion of the upshift. The driver demanded output torque may correspond to the actual accelerator pedal position. Due to the slower response time of the slow-path in comparison to the fast-path, the slow-path torque modulation may request an increase in the rate of engine air intake at time $t_6$ prior to the fast-path modulation commanding an adjustment in the engine spark timing or motor generator torque at time $t_7$.

As the transmission ratio, as depicted in FIG. 2A, approaches the desired or target transmission ratio, the fast-path torque modulation may command an adjustment in the engine spark timing or motor-generator (electric machine) torque at time $t_7$. The transmission input torque, as depicted in FIG. 2D, may increase beginning at time $t_7$ and continue to increase as the slow-path torque modulation, as depicted in FIG. 2B, further requests an increase in the rate of engine air intake proximate the completion of the transmission upshift at time $t_8$.

As the transmission ratio, as depicted in FIG. 2A, indicates that the target transmission ratio has been reached, the fast-path modulation may request a further adjustment in the engine spark timing or motor-generator torque at time $t_9$. The transmission input torque, as depicted in FIG. 2D, may continue to increase to satisfy the driver demanded torque in response to the restoration of the slow-path torque and fast-path torque. The transmission input torque may satisfy the driver demand torque proximate time $t_{10}$.

Figure 3:
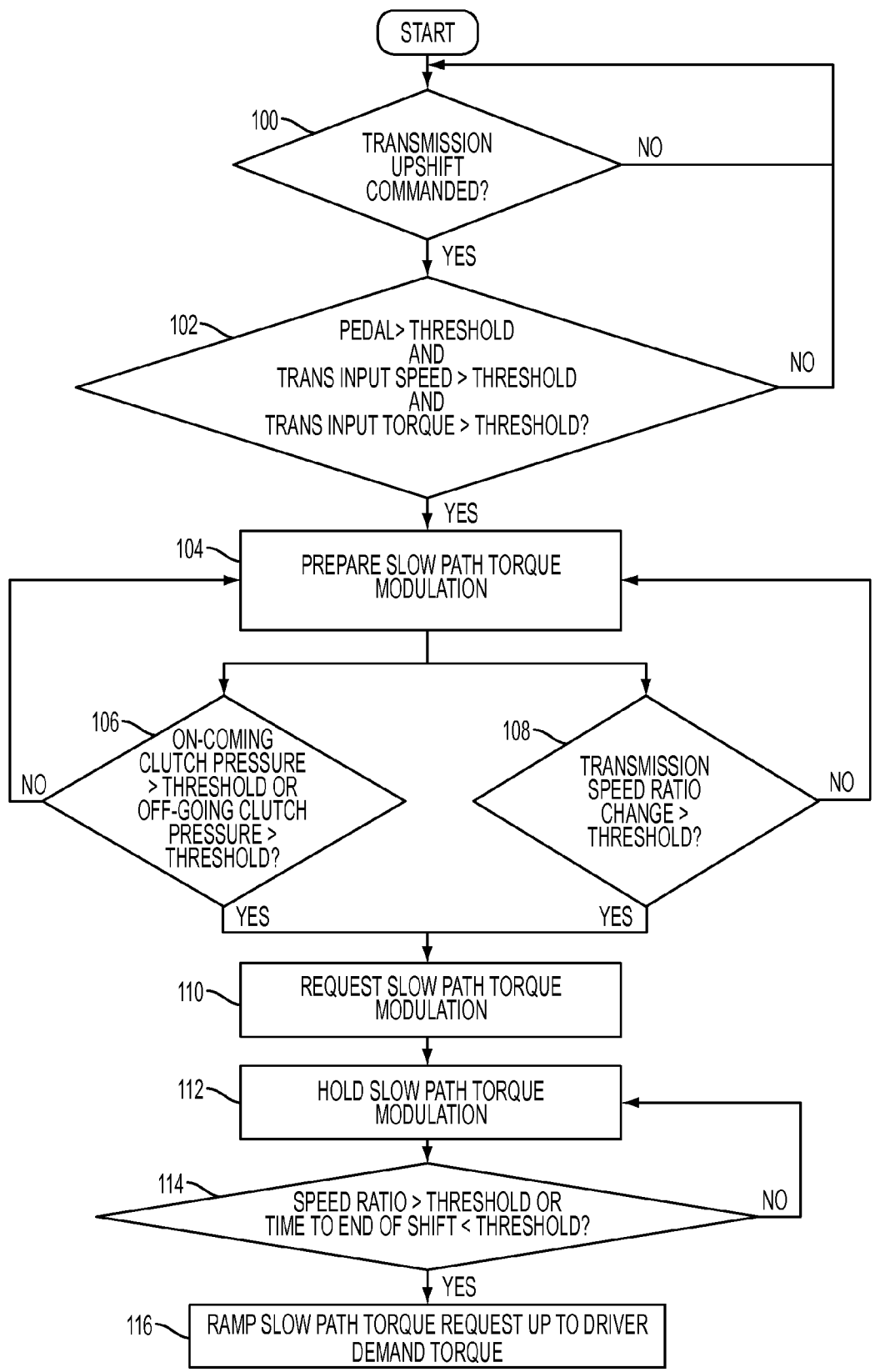
FIG. 3 is a flow chart of an algorithm for controlling a transmission input torque.

Referring to FIG. 3, a flowchart of an exemplary method of controlling the HEV 10 is shown. The method may be executed by the controller 30 and may be implemented as a closed loop control system. For brevity, the method will be described in the context of a single method iteration below.

The control logic may monitor and receive an accelerator pedal position, an engine speed, a transmission element speed, and a transmission input torque as inputs. At block 100, the method may determine if a transmission upshift command is received. If a transmission upshift command is not received, the method may await a transmission upshift command. Should a transmission upshift command be received, the method may continue to block 102.

At block 102, the method may compare the accelerator pedal position to an accelerator pedal position threshold, the transmission element speed to a speed threshold, and the transmission input torque to an input torque threshold. The transmission element speed or torque may be calculated based on a measured or estimated transmission element pressure. If the transmission element torque is less than the threshold, the method may continue to monitor the transmission element torque until the transmission element torque is greater than the threshold. In response to all or a combination of these inputs being greater than their respective thresholds, the control logic may prepare to apply slow path torque modulation to the transmission input torque at block 104.

In preparing to apply slow path torque modulation, the method may compare an on-coming transmission element pressure or torque capacity to a threshold transmission element pressure or torque capacity, at block 106. The method may alternatively compare an off-going transmission element or torque capacity to a threshold transmission element pressure or torque capacity. The method may also monitor or determine the rate of change of the transmission element pressure or torque capacity to determine the start of slow path torque modulation.

In parallel, the method may compare the transmission speed ratio to a threshold or target transmission speed ratio, at block 108. If the speed ratio is greater than a threshold or proximate to the target transmission speed ratio and the element pressure or torque capacity is greater than a threshold, the method may continue to block 110.

At block 110, the method may request a slow-path modulation of the transmission input torque during the transmission upshift. In applying slow-path modulation the method may command a reduction in the rate of engine air intake to reduce the transmission input torque. The amount of reduction in the transmission input torque may be calculated based on the transmission element speed, transmission input torque, or an estimated transmission element torque.

Slow-path modulation may begin prior to or during the engagement of the oncoming shift element and at least prior to completion of the transmission upshift, during a first time period. The first time period may be based on the on-coming shift element pressure or the off-going shift element pressure.

The method may continue applying transmission input torque reduction at block 112. The method may continue to monitor the transmission element speed and transmission input torque to adjust the slow torque modulation request and/or apply fast path torque modulation.

Fast path torque modulation may be used concurrently with slow path torque modulation. In applying fast-path modulation, an adjustment in engine ignition timing or the motor-generator torque may be commanded to reduce the transmission input torque. Fast-path modulation may begin prior to completion of the transmission upshift and at least until completion of the transmission upshift, during a second time period. The magnitude of the fast-path modulation may be based on a transmission element speed/torque or transmission input torque. The duration of the second time period may be based on the transmission speed ratio greater than a threshold or the overall timing of the transmission upshift strategy. The method may apply both slow-path modulation and fast-path modulation while continuing to monitor the transmission speed ratio.

The method may continue to block 114. At block 114, the method may compare the transmission speed ratio to a threshold or target transmission speed ratio associated with the final gear to be achieved upon the completion of the upshift. Alternatively, the method may compare the estimated time until the completion of the upshift event to the elapsed time of the upshift. The estimated time until the completion of the upshift may be calculated based on the current transmission speed ratio, the rate of change of the transmission speed ratio, the target transmission speed ratio, and the transmission element torque capacities.

At block 114, if a target transmission speed ratio is not achieved the method may continue to apply either slow-path modulation or fast-path modulation or a combination of the two. Should the transmission speed ratio be greater than a threshold or the estimated time until the upshift is completed be less than a threshold, indicating that the upshift is nearing completion, the method may continue to block 116.

At block 116, the method may attempt to satisfy the driver requested torque corresponding to the current accelerator pedal position. The method may coordinate between restoration of the slow-path torque and the fast-path torque to satisfy the driver requested torque. The method may command an increase in the rate of engine air intake, to restore the slow-path torque, proximate the end of the first time period. The method may also command a restoration or adjustment in the engine ignition timing and/or the electric machine torque, to restore the fast-path torque, proximate the end of the second time period. The first time period may be greater than the second time period and overlap the first time period.

The restoration of the slow-path and the fast-path torque may result in an increase in the transmission input torque. This may ultimately achieve a transmission upshift with minimized driveline disturbances experienced by the driver during the upshift.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling transmission input torque comprising:
in response to a transmission upshift command, a transmission element speed greater than a speed threshold, and a transmission input torque greater than a torque threshold, reducing a rate of engine air intake prior to initial engagement of an oncoming shift element at least until a target speed ratio is achieved to reduce the transmission input torque such that driveline disturbances associated with the upshift are reduced.

2. The method of claim 1, wherein the reduction in the rate of engine air intake reduces the transmission input torque based on the transmission element speed and a transmission element torque during a first time period.

3. The method of claim 2, wherein the first time period is based on at least one of an oncoming shift element pressure and an off-going shift element pressure.

4. The method of claim 1 further comprising, in response to achieving the target speed ratio, commanding an increase in the rate of engine air intake to satisfy a requested torque corresponding to an accelerator pedal position.

5. A controller for a hybrid electric vehicle comprising:
input communication channels configured to receive an upshift command, an accelerator pedal position signal, a transmission element speed, and an oncoming clutch pressure signal;
output communication channels configured to provide a transmission input torque modulation command; and
control logic configured to, in response to the upshift command, the accelerator pedal position greater than a threshold position, the transmission element speed greater than a threshold speed, and a transmission input torque greater than a threshold torque, command a reduction in a rate of engine air intake proximate engagement of an oncoming clutch to reduce a transmission input torque by a first amount.

6. The controller of claim 5, wherein the control logic is further configured to, in response to an upshift percentage completion being less than a threshold, command an adjustment in at least one of an engine spark timing and an electric machine torque to reduce the transmission input torque by a second amount.

7. The controller of claim 6, wherein the first amount is greater than the second amount.

8. The controller of claim 6, wherein the control logic is further configured to, in response to an upshift percentage completion being greater than a threshold, command an increase in the rate of engine air intake such that a transmission input torque is increased to satisfy a current accelerator pedal position.

9. The controller of claim 6, wherein the control logic is further configured to, in response to a completion of the upshift, command an adjustment in at least one of the engine spark timing and the electric machine torque such that a transmission input torque is increased to satisfy a current accelerator pedal position.

10. The controller of claim 6, wherein the second amount is greater than the first amount.

11. The controller of claim 5, wherein the reduction in the rate of engine air intake is based on the transmission element speed and an estimated transmission element torque.

12. A vehicle comprising:
an electric machine coupled to a transmission;
an engine selectively coupled with the electric machine; and
a controller programmed to, in response to a transmission upshift request, a transmission element speed greater than a threshold speed, and a transmission input torque greater than a threshold torque, command a reduction in a rate of engine air intake to reduce a transmission input torque a first amount during a first time period, based on a transmission element torque and a transmission element speed, prior to a change in transmission ratio.

13. The vehicle of claim 12, wherein the controller is further programmed to, in response to an upshift completion being greater than a threshold, command an adjustment in at least one of an electric machine torque and an engine ignition timing to modulate the transmission input torque a second amount during a second time period based on the transmission element torque and the transmission element speed.

14. The vehicle of claim 13, wherein the first amount is greater than the second amount.

15. The vehicle of claim 13, wherein the controller is further programmed to, in response to completion of the upshift, command a restoration in at least one of the electric machine torque and the engine ignition timing to satisfy a driver torque request.

16. The vehicle of claim 13, wherein the first time period is greater than the second time period.

17. The vehicle of claim 13, wherein the first time period is based on a target transmission speed ratio corresponding to a final gear.

18. The vehicle of claim 12, wherein the controller is further programmed to, in response to an upshift completion greater than a threshold, command an increase in the rate of engine air intake to satisfy a driver torque request prior to the completion of the upshift.

* * * * *